United States Patent
Rajagopalan et al.

(10) Patent No.: US 10,205,602 B2
(45) Date of Patent: Feb. 12, 2019

(54) ECMP PARENT GROUP SELECTION FOR MULTIDESTINATION TRAFFIC IN DCE/TRILL NETWORKS

(71) Applicant: Cisco Technology, Inc., San Jose, CA (US)

(72) Inventors: Santosh Rajagopalan, San Jose, CA (US); Ajay Kulhari, Sunnyvale, CA (US); Hariharan Balasubramanian, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/827,273

(22) Filed: Nov. 30, 2017

(65) Prior Publication Data

US 2018/0097645 A1     Apr. 5, 2018

Related U.S. Application Data

(62) Division of application No. 14/949,915, filed on Nov. 24, 2015, now Pat. No. 9,876,649, which is a division of application No. 13/251,957, filed on Oct. 3, 2011.

(51) Int. Cl.
| | |
|---|---|
| *H04L 12/18* | (2006.01) |
| *H04L 12/24* | (2006.01) |
| *H04L 12/721* | (2013.01) |
| *H04L 12/709* | (2013.01) |

(52) U.S. Cl.
CPC .......... *H04L 12/185* (2013.01); *H04L 41/12* (2013.01); *H04L 45/245* (2013.01); *H04L 45/32* (2013.01); *H04L 45/66* (2013.01); *Y02B 70/30* (2013.01); *Y02D 50/30* (2018.01)

(58) Field of Classification Search
CPC ..... H04L 12/185; H04L 45/32; H04L 45/245; H04L 45/66; H04L 41/12; H05K 999/99; Y02B 70/30; Y02B 50/30
See application file for complete search history.

(56) References Cited

U.S. PATENT DOCUMENTS

| | | | |
|---|---|---|---|
| 7,310,335 B1 | 12/2007 | Garcia-Luna-Aceves et al. | |
| 8,014,278 B1 * | 9/2011 | Subramanian | H04L 12/2867 370/229 |
| 8,259,569 B2 | 9/2012 | Banerjee et al. | |
| 8,509,087 B2 | 8/2013 | Rajagopalan et al. | |
| 8,619,584 B2 * | 12/2013 | Dhar | H04L 47/125 370/235 |

(Continued)

OTHER PUBLICATIONS

Eastlake, "RBridges and the IETF TRILL Protocol", North American Network Operators' Group (NANOG) 50 meeting, Oct. 3, 2010, 83 pgs.

(Continued)

*Primary Examiner* — Jay P Patel
(74) *Attorney, Agent, or Firm* — Merchant & Gould P.C.

(57) ABSTRACT

Consistent with embodiments of the present disclosure, systems and methods are disclosed for providing per-group ECMP for multidestination traffic in a DCE/TRILL network. Embodiments enable per-group load balancing of multidestination traffic in DCE/L2MP networks by creating a new IS-IS PDU to convey the affinity of the parent node for a given multicast group. For broadcast and unknown unicast flooded traffic, the load balancing may be done on a per-vlan basis.

9 Claims, 4 Drawing Sheets

(56) References Cited

U.S. PATENT DOCUMENTS

| | | |
|---|---|---|
| 8,755,277 B2 | 6/2014 | Banerjee et al. |
| 9,876,649 B2 | 1/2018 | Rajagopalan et al. |
| 2007/0025276 A1 | 2/2007 | Zweibel et al. |
| 2007/0177594 A1 | 8/2007 | Kompella |
| 2009/0037607 A1 | 2/2009 | Farinacci et al. |
| 2009/0201803 A1 | 8/2009 | Filsfils et al. |
| 2010/0020797 A1 | 1/2010 | Casey et al. |
| 2010/0061269 A1 | 3/2010 | Banerjee et al. |
| 2010/0061272 A1 | 3/2010 | Veillette |
| 2010/0265824 A1* | 10/2010 | Chao ............... H04L 12/66 370/235 |
| 2010/0290458 A1* | 11/2010 | Assarpour ......... H04L 45/00 370/389 |
| 2011/0267947 A1* | 11/2011 | Dhar ............... H04L 47/125 370/235 |
| 2011/0299528 A1 | 12/2011 | Yu et al. |
| 2012/0134266 A1* | 5/2012 | Roitshtein ......... H04L 47/125 370/230 |
| 2012/0275347 A1 | 11/2012 | Banerjee et al. |
| 2012/0320800 A1 | 12/2012 | Kamble et al. |
| 2013/0051250 A1 | 2/2013 | Shaffer et al. |
| 2013/0083660 A1 | 4/2013 | Rajagopalan et al. |
| 2013/0254356 A1 | 9/2013 | Eastlake, III |
| 2013/0279513 A1 | 10/2013 | Eastlake, III |
| 2016/0080162 A1 | 3/2016 | Rajagopalan et al. |

OTHER PUBLICATIONS

Perlman, "RBridges: Transparent Routing", IEEE Infocom 2004, 8 pgs.

Perlman et al., "RFC 6326: Transparent Interconnection of Lots of Links (TRILL) Use of IS-IS", Internet Engineering Task Force (IETF), Jul. 2011, 25 pgs.

Jacobsen, "Introduction to TRILL", The Internet Protocol Journal, Cisco, Sep. 2011, vol. 14, No. 3, 32 pgs.

Eastlake et al., rfc 6326, Transparent Interconnection of Lots of Links (TRILL) Use of IS-IS, Jul. 2011, 25 pgs.

Banerjee et al., rfc 6165, Extensions to IS-IS for Layer-2 Systems, Apr. 2011, 7 pgs.

Gai, "[rbridge] How is an IS-IS packet differentiated from layer 3 ISIS,and TRILL-encapsulated data packets?", May 20, 2007, 4 pgs.

Perlman et al., rfc6325, "Routing Bridges (RBridges): Base Protocol Specification", Jul. 2011, 99 pgs.

Xi et al.: "Enabling Flow-based Routing Control in Data Center Networks using Probe and ECMP", IEEE 2011, pp. 608-613 (U.S. Appl. No. 13/251,957, Office Action dated May 9, 2014).

* cited by examiner

ECMP PARENT GROUP SELECTION FOR MULTIDESTINATION TRAFFIC IN DCE/TRILL NETWORKS

RELATED APPLICATIONS

This application is a division of U.S. application Ser. No. 14/949,915 filed Nov. 24, 2015, now U.S. Pat. No. 9,876,649, which is a division of U.S. application Ser. No. 13/251,957 filed Oct. 3, 2011, both of which are entirely incorporated herein by reference.

BACKGROUND

Fabricpath/Transparent Interconnection of Lots of Links ("FP/TRILL") is a multipathing solution, amongst other benefits, provided in a layer 2 network. The multipathing solution is provided to unicast by use of Equal-Cost Multi-Path Routing ("ECMP"). For unknown unicast, broadcast and multicast traffic (henceforth referred to as multidestination traffic), the mechanism to provide multipathing is by using multiple trees, with each tree rooted at a different switch. The use of multiple trees may be expensive to maintain both in terms of software and hardware resources. Therefore, there exists a need to obtain graphs constructed for unicast traffic and use them for multidestination traffic also. This not only provides a way of using ECMP for multidestination traffic, but also uses fewer resources and unified controlplane constructs for unicast and multidestination traffic.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
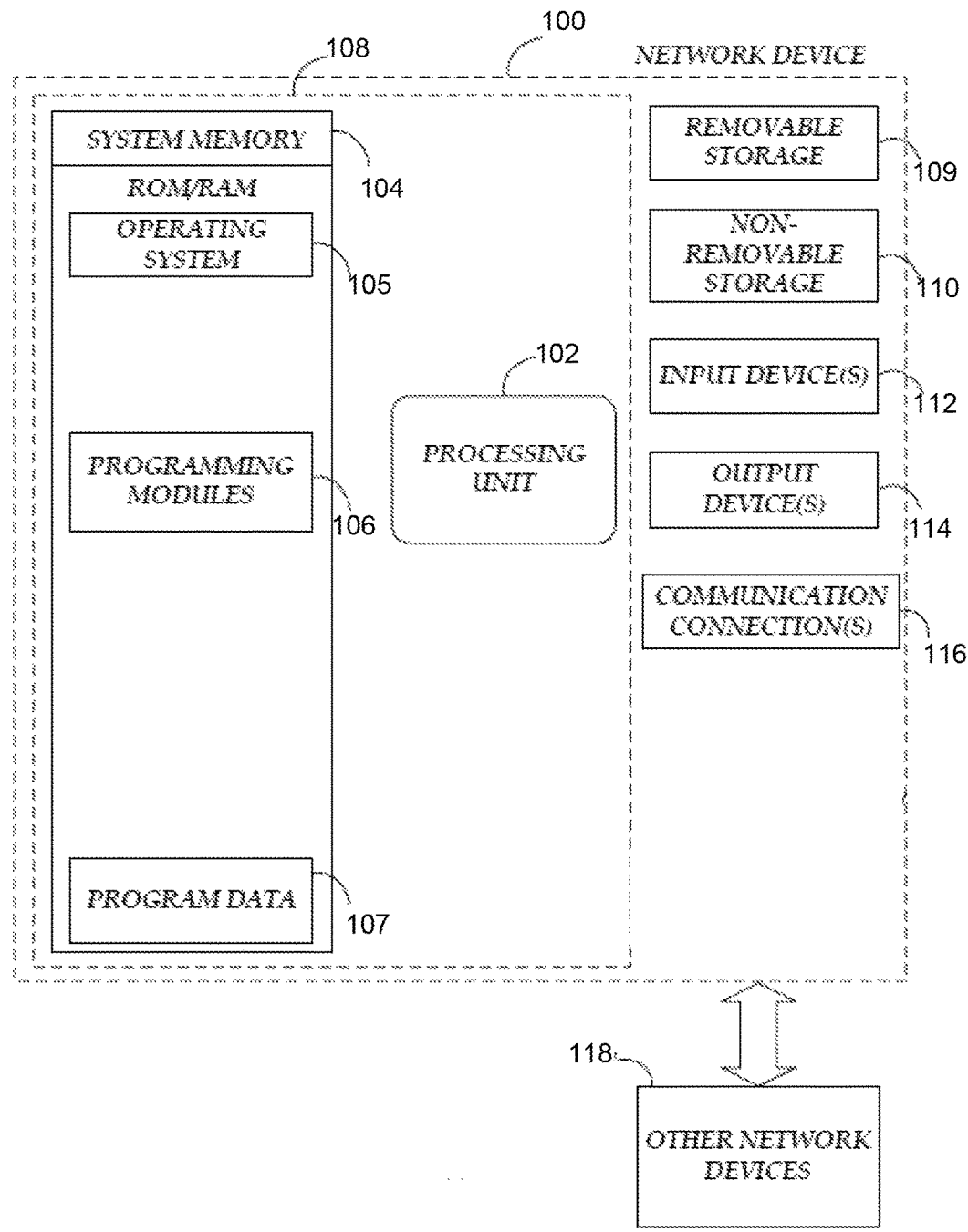
FIG. 1 is a block diagram of a network device operable according to embodiments of this disclosure.

Consistent with embodiments of the present disclosure, systems and methods are disclosed for providing per-group ECMP for multidestination traffic in a FP/TRILL network. Embodiments enable per-group load balancing of multidestination traffic in FP/TRILL networks by creating a new IS-IS PDU to convey the affinity of the parent node for a given multicast group. For broadcast and unknown unicast flooded traffic, the load balancing may be done on a per-vlan basis.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FP/TRILL may provide Layer 2 multicast multipathing by creating a plurality of trees for multidestination packets. This may provide for multipathing on a per-flow basis, but can require extra hardware and software resources. Classical Layer 2 Ethernet (using Per-Vlan Rapid Spanning Tree Protocol ("PVRSTP") for instance) can construct a spanning tree for each vlan and provide multiple paths, but only on a per-vlan granularity. For Layer 3 multicast, there have been solutions that provide multicast multipathing on a per-group basis for L3 multicast using Protocol Independent Multicast ("PIM"). These solutions require a tree, constructed by PIM protocol packets, for multicast but allows for ECMP towards PIM RP or Source Router. However, none of these prior approaches obtain graphs constructed for unicast traffic and use them for multidestination traffic also. Described embodiments herein use fewer resources and unified controlplane constructs for unicast and multidestination traffic.

It should be understood that FP/TRILL may use an extension of Intermediate System to Intermediate System ("IS-IS") as its routing protocol. In described embodiments, it may be necessary to propagate a special type of Label Switched Path ("LSP") also called Group-Membership LSPs ("GM-LSP"). A GM-LSP may be an LSP that conveys the per-VLAN Layer 2 multicast address derived from IPv4 IGMP or IPv6 MLD notification messages received from attached nodes in the vlan, indicating the location of listeners for these multicast addresses. Since the LSPs are flooded by reliable flooding, all the FP/TRILL nodes in the network have information on where different multicast group listeners are located in the network.

Unlike Layer-3 PIM multicast, the trees constructed for multipathing in FP/TRILL may not be driven by any control plane/data packets. In FP/TRILL, a certain number of FP/TRILL switches are selected as roots and trees are created using those nodes (switches) as roots. The FP/TRILL dataplane packets may have extra encapsulation that identifies both the source of the multicast as well as the chosen tree on which the multidestination packet must traverse.

Embodiments described herein, instead of using trees for multicast, may use ECMPs. The ECMPs constructed for unicast traffic forwarding may also be used for multidestination traffic forwarding. With ECMPs a switch can have multiple parent switches for a given source switch (compared to trees where there is just one parent). It should be ensured that a child switch receives at most one copy of the frame. Each switch should have only one parent, for a given source switch, which may forward a copy for a given group.

To accomplish this, embodiments herein propose a new PDU extension to IS-IS similar to extensions proposed in "Extensions to IS-IS for Layer-2 Systems". In addition to GM-LSP flooding, a switch with interested multicast receivers for a multicast group indicates to each of the parent switches for a given source switch via the PDU (also referred to as Group Parent Select PDU or GPS-PDU), which one of its multiple parents (when multiple parents exist for a switch) should send traffic to it for a given multicast group address.

In the forwarding plane, there will no longer be a requirement to use the tree identifier in the data packet (FTAG in FP for ingress rbridgeid in TRILL), as there are no longer different trees for multidestination multipathing. In some embodiments, a special tree identifier can be used to indicate that these data packets are using the enhanced protocol to facilitate interoperability between embodiments and the present scheme used in FP/TRILL. Nicknames from 0xFFC0 through 0xFFFF and 0x0000 are reserved nicknames in TRILL. One of these may be reserved for the special identifier).

The outgoing interface list computed at an intermediate parent for a given multicast group may simply include the ECMP path that was signaled by the PDU. In the forwarding plane, the Incoming Interface Check (IIC) in FP or the Reverse Path Forwarding Check (RPF Check) in TRILL, is modified such that the check is performed on a per-multicast Group basis/per-Source Switch basis instead of a per-Source Switch (or per-ingress RBridge Switch in TRILL) basis as done in current FP/TRILL implementations.

The GPS-PDU may be sent between a switch and its parent switch in a ECMP graph, for each switch in the network. First, each switch in the network may choose a parent switch to accept the traffic for a given group. Next, the parent choice for a group is centralized at each switch.

FIG. 1 is a block diagram of a system including network device 100. Embodiments of per-group ECMP for multidestination traffic in FP/TRILL networks may be implemented in one or more network devices, such as network device 100 of FIG. 1. In embodiments, network device 100 may be a network switch, network router, or other suitable network device. Any suitable combination of hardware, software, or firmware may be used to implement embodiments of per-group ECMP for multidestination traffic in FP/TRILL networks. For example, embodiments of per-group ECMP for multidestination traffic in FP/TRILL networks may be implemented with network device 100 or any of other network devices 118. The aforementioned system, device, and processors are examples and other systems, devices, and processors may comprise the aforementioned memory storage and processing unit, consistent with embodiments of per-group ECMP for multidestination traffic in FP/TRILL networks.

With reference to FIG. 1, a system consistent with embodiments of per-group ECMP for multidestination traffic in FP/TRILL networks may include a network device, such as network device 100. In a basic configuration, network device 100 may include at least one processing unit 102 and a system memory 104. Depending on the configuration and type of network device, system memory 104 may comprise, but is not limited to, volatile (e.g., random access memory (RAM)), non-volatile (e.g., read-only memory (ROM)), flash memory, or any combination. System memory 104 may include operating system 105, one or more programming modules 106, and may include program data 107. Operating system 105, for example, may be suitable for controlling network device 100's operation. Furthermore, embodiments of per-group ECMP for multidestination traffic in FP/TRILL networks may be practiced in conjunction with a graphics library, other operating systems, or any other application program and is not limited to any particular application or system. This basic configuration is illustrated in FIG. 1 by those components within a dashed line 108.

Network device 100 may have additional features or functionality. For example, network device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 100. Any such computer storage media may be part of device 100. Network device 100 may also have input device(s) 112 such as a keyboard, a mouse, a pen, a sound input device, a touch input device, etc. Output device(s) 114 such as a display, speakers, a printer, etc. may also be included. The aforementioned devices are examples and others may be used.

Network device 100 may also contain a communication connection 116 that may allow network device 100 to communicate with other network devices 118, such as over a network in a distributed network environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 104, including operating system 105. While executing on processing unit 102, programming modules 106 may perform processes including, for example, one or more of method 200, 300, or 400's stages as described below.

Figure 2:
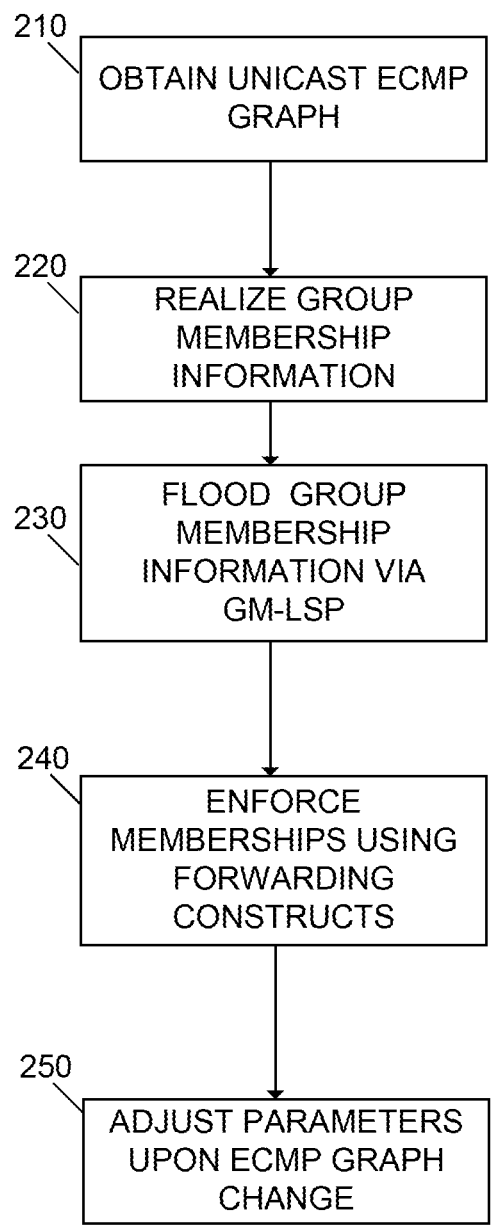
FIG. 2 is a flow chart of a method according to embodiments of this disclosure.

FIG. 2 is a flow chart illustrating the steps to support multipathing across multicast groups according to embodiments described herein. The method may begin at step 200 where the unicast ECMP graph is initially obtained. The method may then proceed to step 210 where for each switch in the network, the available paths and the available parents for that switch are identified by using the unicast ECMP graph.

The method may next proceed to step 220 where as group membership information is realized (using IGMP or MLD), local policy information may be used to inform the parents of the chosen parent of this group. The method may then advance to step 230 where the group membership info is flooded via GM-LSP as required by FP/TRILL.

Next, at step 240 the parents and child may enforce the selection made using forwarding constructs. Finally, at step 250, if there is a change in the ECMP graph, needed adjustments may be made after re-obtaining the ECMP graph.

In some embodiments, there could be some multidestination groups such as Broadcast or floods due to an unknown L2 unicast packet. These multidestination packets share the same group address and so they would not benefit from multipathing on a per-group basis. In these scenarios, the parent may be chosen based on VLAN for these special groups. This would be over and above the selection of parent based on multicast groups for the same vlan. Thus, multipathing for multicast groups for a given vlan and multipathing for constant group multidestination groups across different vlans may still be achieved.

Current FP/TRILL capable hardware may support embodiments of multi-pathing across groups without performing IIC/RPF check. There will be a small but significant basic change needed to perform the modified IIC/PRF checks using multicast group address. This involves checking the (multicast group, source switch ID) information against the allowed list of incoming interfaces. This is a version of Reverse Path Forwarding (RPF) check, and is meant to avoid loops and duplicates.

It should be noted that the current implementation of DCE/TRILL may provide multidestination multipathing at a flow-level (at the extra cost of more trees, all paths not necessarily being used, etc). The present disclosure simplifies hardware resources, and allows for multidestination multipathing on a per-group level by enabling per-group loadbalancing of multidestination traffic in DCE/L2MP networks by using a new ISIS PDU to convey the affinity of the parent node for a given multicast group. For broadcast and unknown unicast flooded traffic, loadbalancing may be done on a per-vlan basis.

Enabling the use of unicast ECMP graph for multidestination traffic may eliminate the software and hardware complexity of maintaining multiple trees for the loadbalancing of multidestination traffic. This also has added benefit of faster convergence when there is a change in network topology.

In some embodiments, the receiver of the multicast traffic may need to ensure that it accepts traffic only on interfaces its control plane at a given time that indicates the traffic should be accepted. In these embodiments, an RPF check is required per-group, per-source-switch. It should be understood that in most embodiments, the RPF checks can be considered optional.

For example, say there are 100 switches in a network and for multicast multipathing there are 5 different trees. In this example, there may be 100 multicast groups. The RPF check table in current implementations of DCE/TRILL would then require 500 entries in each of the switches. However the number of RPF check entries needed in embodiments described herein is quite different. At a given switch, if for the given source switch there is only one parent, then only one entry in the RPF check table is needed.

If the table allows for masking of some lookup fields, then it would be possible to mask the group address and use only one entry. So for cases such as these, the described embodiments result in better table utilization. For situations where there are more than one parent switch for a given source switch, the number of RPF entries needed may be as great as the number of multicast groups. However, in the majority of topologies, there will be only small group of switches that will have multiple parents as seen from a given switch where the RPF entries are installed and so the RPF entries would scale reasonably.

Figure 3:
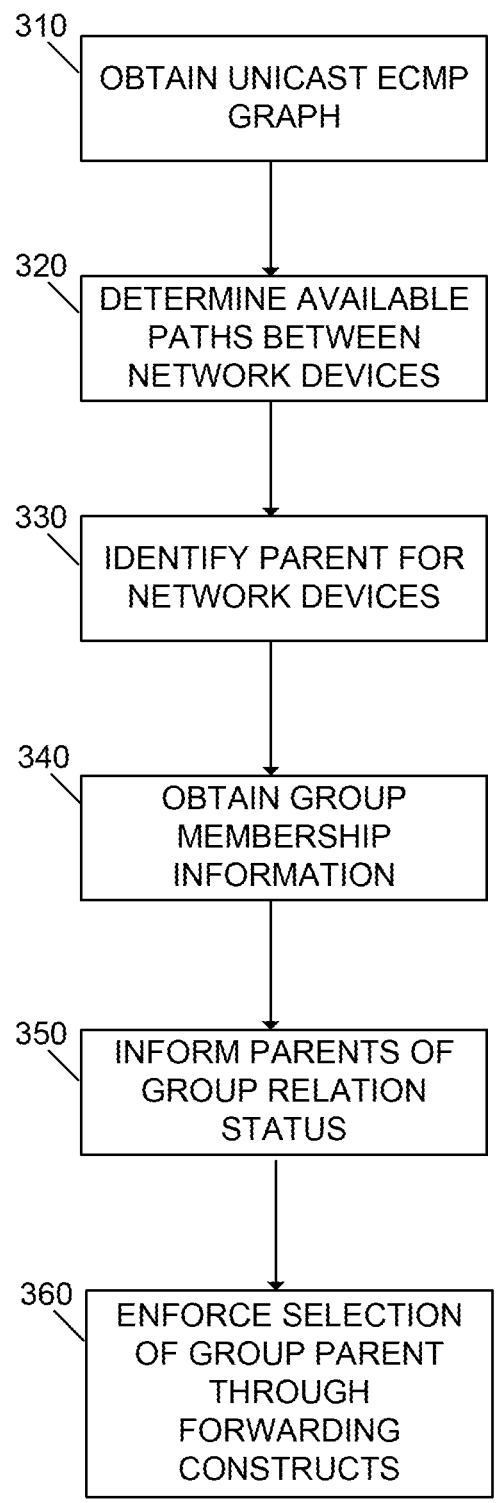
FIG. 3 is a flow chart of a method according to embodiments of this disclosure.

FIG. 3 is a flow chart illustrating embodiments of the present disclosure. Method 300 may begin at step 310 where a unicast ECMP graph may be obtained. Once the unicast ECMP graph is obtained, method 300 may proceed to step 320. At step 320 available paths for a plurality of network devices may be identified from the unicast ECMP graph. For example, there may be a plurality of paths over which data can travel from a first network device to a second network device.

Once available network paths have been determined, method 300 may proceed to step 330. At step 330, the parents for each of the network devices may be identified. Similarly, at step 340, group membership information for each of the identified network devices may be obtained. In some embodiments, the group membership information may be obtained using local policy information via IGMP or MLD protocols. Single parent switches may be designated on a per-group basis.

Next, at step 350, identified parents of chosen group parent information derived from the group membership information are informed of their designated status. In some embodiments, sending a GPS-PDU between each of the plurality of network devices and their respective associated parent network devices. The GPS-PDU may indicate which of multiple parents existing for a network device should receive traffic from the source switch for a given multicast group address. Following this, method 300 may proceed to step 360. At step 360, the chosen group parent information may be flooded to the other network devices via group membership LSP ("GM-LSP").

Once the parent information has been distributed, method 300 may proceed to step 360 and enforce selection of group information through forwarding constructs. In some embodiments, step 360 may include selecting an associated parent network device to accept traffic for a designated group. In some embodiments, enforcement may include dynamically adjusting chosen group parent information upon notification of a change in the unicast ECMP graph. Furthermore, in some embodiments, the address associated with the designated group may be masked using any number of know methods.

Figure 4:
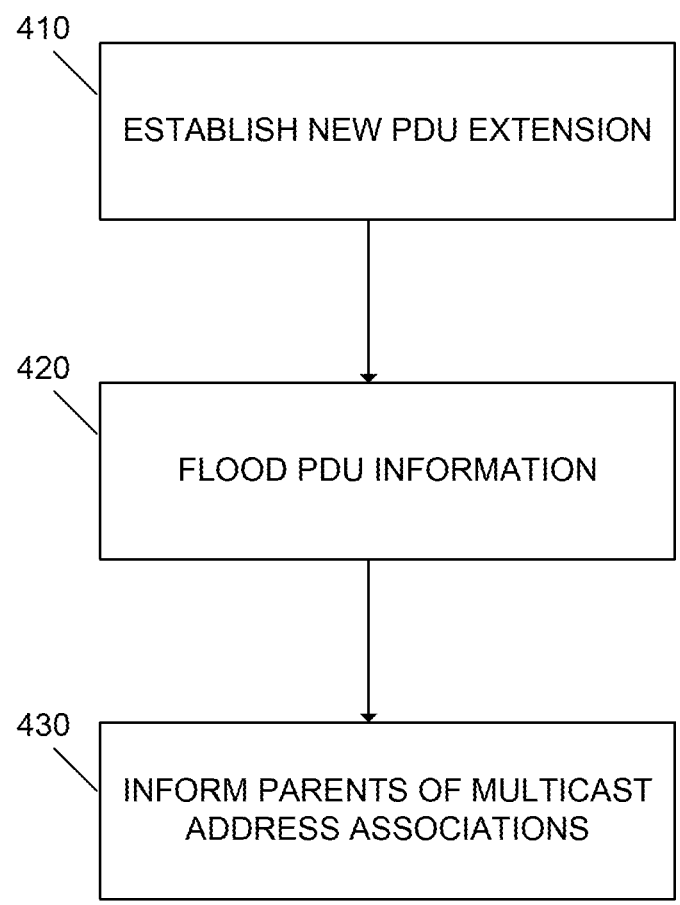
FIG. 4 is a flow chart of a method according to embodiments of this disclosure.

FIG. 4 is a flow chart illustrating embodiments of the present disclosure. Method 400 may start at step 410 where a PDU extension is established as an extension to the IS-IS protocol. In some embodiments, an identifier may be established to alert switching devices that an enhanced protocol is employed. This identifier may be stored in space reserved for TRILL nicknames. Once the PDU extension has been established, method 400 may proceed to step 420. At step 420, the network may flood information associated with the first PDU extension to a plurality of switches in a network, wherein each of the plurality of switches has interested multicast receivers for a first group.

Here, in some embodiments, an outgoing interface list may be created at an intermediate parent switch. The outgoing interface list may only include the ECMP path signaled by the PDU. The list information may be employed to further modify an incoming interface check or a reverse path forwarding check resulting in the check being done on a per-multicast group/per-source switch basis.

Method 400 may then advance to step 430 where it may be indicating via PDU information which of a plurality of parent switches should send traffic associated with a given multicast address.

Embodiments of the present disclosure include many advantages to prior art systems, including aiding in multicast multi-pathing across groups in same VLAN. Embodiments further provide important multicast features like resiliency, faster convergence and redundancy. Also, embodiments described herein do not require software to build and maintain multiple trees and allows for multicast forwarding to be derived from unicast forwarding information.

Unlike current DCE/TRILL implementations there is no requirement for embodiments of the present disclosure to compute multiple trees rooted at different switches for multidestination multipathing. If the underlying topology changes then, the link state protocol reconverges at the changed topology. If a given node determines that the list of parents for a given source switch has changed, it sends out GPS-PDU to communicate the new mapping between the multicast groups and parent interface.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. An apparatus comprising:
   a memory storage; and
   a processing unit coupled to the memory storage, wherein the processing unit is operative to:
   obtain a unicast Equal-Cost Multi-Path (ECMP) Routing graph;
   perform load balancing based on a hash packet associated with the unicast ECMP graph;
   select a unicast path based on load balancing; and
   determine per-group based on the unicast ECMP graph which of a plurality of parent switches can send traffic directed to each group such that a single parent switch exists for each source switch.

2. The apparatus of claim 1, wherein the processor is further operative to add an outgoing interface to a tree associated with the determined parent switch.

3. The apparatus of claim 2, wherein the processor is further operative to add a Protocol Data Unit (PDU) extension to an Intermediate System to Intermediate System (IS-IS) protocol.

4. A method comprising:
   obtaining a unicast Equal-Cost Multi-Path (ECMP) Routing graph;
   performing load balancing based on a hash packet associated with the unicast ECMP graph;
   selecting a unicast path based on load balancing; and
   determining per-group based on the unicast ECMP graph which of a plurality of parent switches can send traffic directed to each group such that a single parent switch exists for each source switch.

5. The method of claim 4, further comprising adding an outgoing interface to a tree associated with the determined parent switch.

6. The method of claim 5, further comprising adding a Protocol Data Unit (PDU) extension to an Intermediate System to Intermediate System (IS-IS) protocol.

7. A computer-readable medium that stores a set of instructions which when executed perform a method comprising:
   obtaining a unicast Equal-Cost Multi-Path (ECMP) Routing graph;
   performing load balancing based on a hash packet associated with the unicast ECMP graph;
   selecting a unicast path based on load balancing; and
   determining per-group based on the unicast ECMP graph which of a plurality of parent switches can send traffic directed to each group such that a single parent switch exists for each source switch.

8. The computer-readable medium of claim 7, further comprising adding an outgoing interface to a tree associated with the determined parent switch.

9. The computer-readable medium of claim 8, further comprising adding a Protocol Data Unit (PDU) extension to an Intermediate System to Intermediate System (IS-IS) protocol.

* * * * *